Nov. 15, 1949  C. A. KLEIN  2,488,415
TOW BAR
Filed Feb. 15, 1949  2 Sheets-Sheet 1

INVENTOR.
Cletus A. Klein.
BY
Frank C. Fearman
ATTORNEY

Nov. 15, 1949  C. A. KLEIN  2,488,415
TOW BAR
Filed Feb. 15, 1949  2 Sheets-Sheet 2
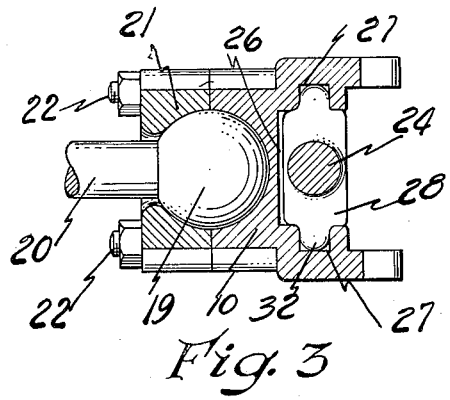
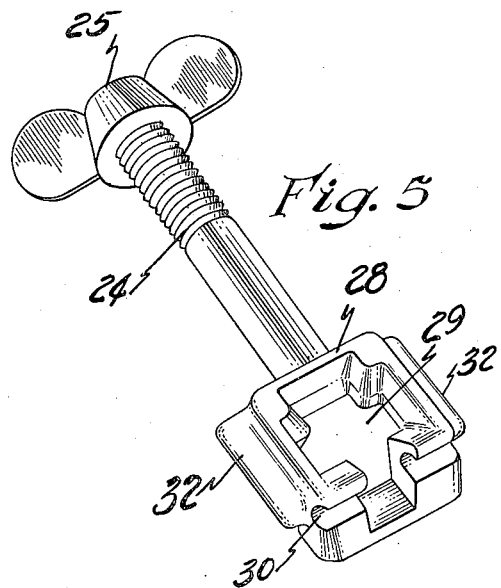
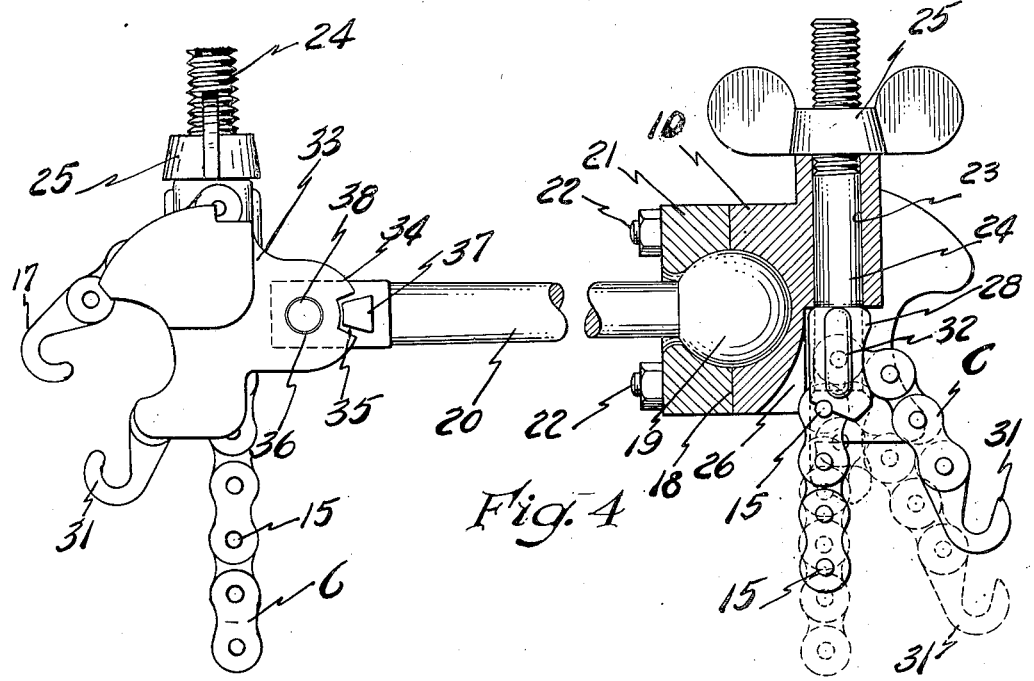
INVENTOR.
Cletus A. Klein.
BY Frank C. Fearman
ATTORNEY Patented Nov. 15, 1949

2,488,415

UNITED STATES PATENT OFFICE 2,488,415

TOW BAR

Cletus A. Klein, Caro, Mich., assignor to Caro Manufacturing Co., Caro, Mich.

Application February 15, 1949, Serial No. 76,587

4 Claims. (Cl. 280—33.44)

This invention relates to tow bars for coupling a trailer or other vehicle to the bumper of a power vehicle.

One of the prime objects of the invention is to design a tow bar which can be easily and quickly connected to or disconnected from an automobile bumper without the use of special tools, and without boring holes or otherwise defacing the bumper.

Another object of the invention is to design a draft bar provided with flexible securing means which is adjustable to fit bumpers of various sizes, shapes, and configurations, and which permits universal movement in any direction as necessary when traveling over rough and uneven roadways, without binding, cramping, or in any manner interfering with the conventional movement of the vehicle.

A further object is to design a tow bar composed of few parts, all of simple, sturdy construction, which can be readily manufactured and assembled, and which can be easily and quickly attached and removed.

Still a further object is to provide a tow bar provided with an adjustable take up member, and guides in the head for guiding and reinforcing said take up member.

To the accomplishment of the foregoing and related ends, said invention then consists of the means hereinafter more fully described and particularly pointed out in the appended claims, the annexed drawings and following description setting forth in detail certain means and one mode of carrying out the invention, such disclosed means and mode illustrating, however, but one of the various ways in which the principle of the invention may be used.

In the drawings:

Fig. 3 is a sectional, plan view taken on the line 3—3 of Fig. 1 with the bumper omitted.

Fig. 4 is a vertical, sectional view of the assembled tow bar, the broken lines illustrating the adjustment of the lower chain.

Fig. 5 is an isometric view of the adjusting bolt.

The instant application is directed broadly to tow bars in general and is an improvement on the construction shown in my pending application for patent on Tow bars, filed August 14, 1948, Serial No. 44,335.

Figure 2:
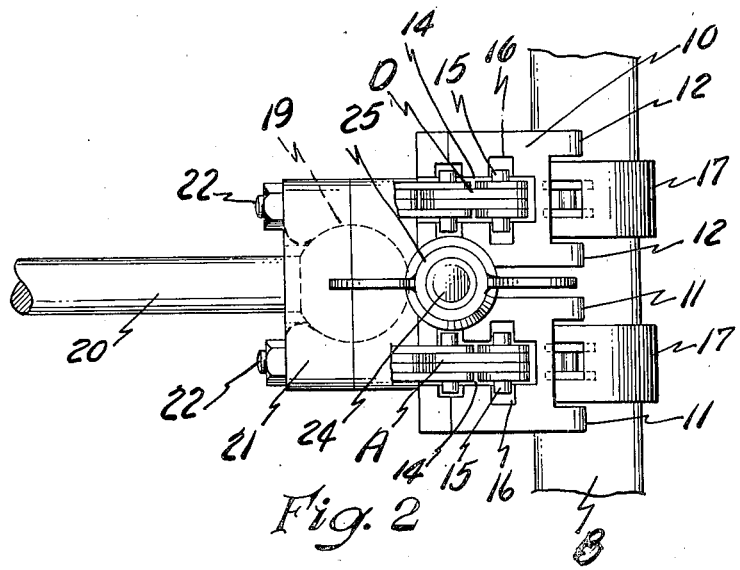
Fig. 2 is a top, plan view.
Figure 1:
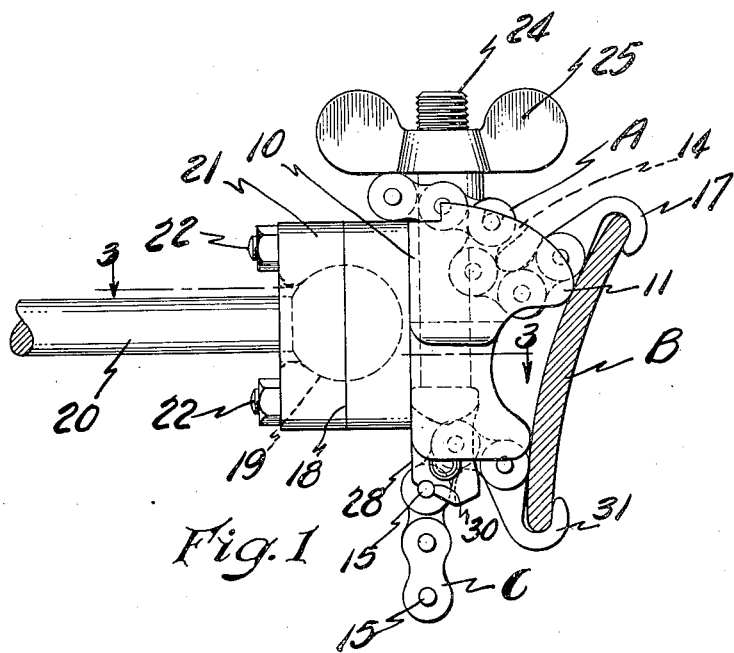
Fig. 1 is a side-elevational view of my tow bar attached to the bumper of an automobile, which bumper is shown in cross section.

Referring now more specifically to the drawings in which I have shown the preferred embodiment of my invention, the tow bar comprises a preferably cast head element 10 formed as clearly shown in Figs. 1 and 2 of the drawings, the front of the head being formed with pairs of spaced-apart ears 11 and 12, cast integral therewith, and a downwardly and outwardly extending chain accommodating passage 14 is formed in said head between each pair of ears, and in which the link chains A and D are adjustably mounted, the hinge pins 15 of said chains projecting beyond the sides thereof, and pin seats 16 are provided in the head as shown to accommodate said pins, a hook link 17 being provided on the outer end of each chain for easy attachment to the upper edge of an automobile bumper indicated at B.

The rear face 18 of the head element 10 is flat as shown, and is bored to accommodate the ball section 19 of the tow draft bar 20, a plate 21 being bored in a similar manner and is held in position by means of bolts 22, said plate serving to secure the ball 19 in position while permitting limited universal movement thereof.

A centrally disposed vertical opening 23 is provided in the head 10 between the chain passages 14, and a bolt 24 is adjustably mounted therein, the upper end of said bolt being threaded as shown, and a wing nut 25 is provided thereon for easy manipulation thereof.

A recess 26 is provided in the head element 10, and vertical guides or ways 27 are provided in the side walls thereof, and in which the lower end section of the bolt 24 is slidably mounted, said lower end being formed with an enlarged, flatted section 28 having a chain-accommodating opening 29 therein, and a grooved pin seat 30 is provided in the lower edge and accommodates one of the hinge pins 15 of the lower link chain C, a hook link 31 being provided on the end of the chain for easy attachment to the lower edge of the bumper.

Vertical ribs 32 are cast integral with the edges of the flatted end of the bolt 24 and slidably engage and travel in the guides or ways 27 as the bolt is actuated, this arrangement and construction eliminating any bending or binding of the bolt, as the pulling strain is taken by the head element 10 and not by the bolt.

A coupling head 33 is provided on the opposite end of the tow draft bar 20 and is formed substantially similar to the head 10, excepting that the rear face is formed with spaced-apart rearwardly projecting walls 34 having cut-out sectors 35 in the edges thereof, and openings 36 are provided in said walls in horizontal alignment with said sectors.

The draft bar 20 can be of any desired shape and in the instant application I have shown the one end substantially square in cross section, and having laterally projecting lugs 37 formed integral therewith, which lugs are accommodated in the cut-out sectors 35 for limited movement therein.

A horizontally disposed pin 38 serves to connect the tow draft bar 20 to the walls 34, the lugs 37 serving to limit the vertical swinging action of the head with relation to the draft bar and preventing a jack-knifing effect.

When attaching the tow bar to a vehicle bumper, a nut 25 is first released so that the bolt 24 slides downwardly in the guides 27. The hook links 17 of the upper chains A and D are then hooked over the upper edge of the bumper, and the chains are then drawn taut, with one of the hinge pins 15 seated in the pin seat 16. The next step is to attach the lower chain C, the hook link 31 being first hooked in the lower edge of the bumper and drawn taut, after which the wing nut 25 is manipulated to draw the bolt 24 upwardly in the guides 27, thus tightening the chains so that the head is firmly secured to the bumper. The opposite head is attached to the bumper in the same manner as previously described. The attachment is simple and easy, and can be quickly and easily accomplished.

In view of the foregoing description taken in conjunction with the accompanying drawings, it is believed that a clear understanding will be apparent to those skilled in the art, and a more detailed description is accordingly deemed unnecessary.

Having described the invention, what is claimed as new is:

1. A towing device of the class described comprising a head having a bar universally connected thereto, spaced chain passages in the upper end of the head, pin seats in the walls defining said passages, link chains accommodated in said passages and provided with projecting hinge pins for releasable engagement with said seats, hook links on the end of the chains for engagement with an automobile bumper, a vertical adjustable bolt mounted in said head and terminating in a flatted section formed with an enlarged opening therein, a chain releasably anchored to said bolt and detachably engaging the lower edge of the bumper, and guides in the head for slidable engagement with said flatted section as the bolt is adjusted.

2. In a towing device of the class described comprising a head element, a recess in the lower end thereof, a centrally disposed opening in said head and opening into said recess, guides on the side walls of the recess, a bolt mounted in said opening and formed with a flatted end section having a link chain accommodating opening therein, a link chain releasably connected to said flatted section, additional chain passages in said head on opposite sides of said bolt, link chains in said passages and releasably connected to said head, and an automobile bumper respectively, and means for adjusting said bolt.

3. The combination set forth in claim 2 in which a pin seat is provided in the flatted end of said bolt for releasably accommodating a projecting hinge pin of the link chain.

4. The combination defined in claim 2 in which tracks are provided on the flat end of the bolt for slidable engagement with the guides.

CLETUS A. KLEIN.

No references cited.